United States Patent Office 3,196,115
Patented July 20, 1965

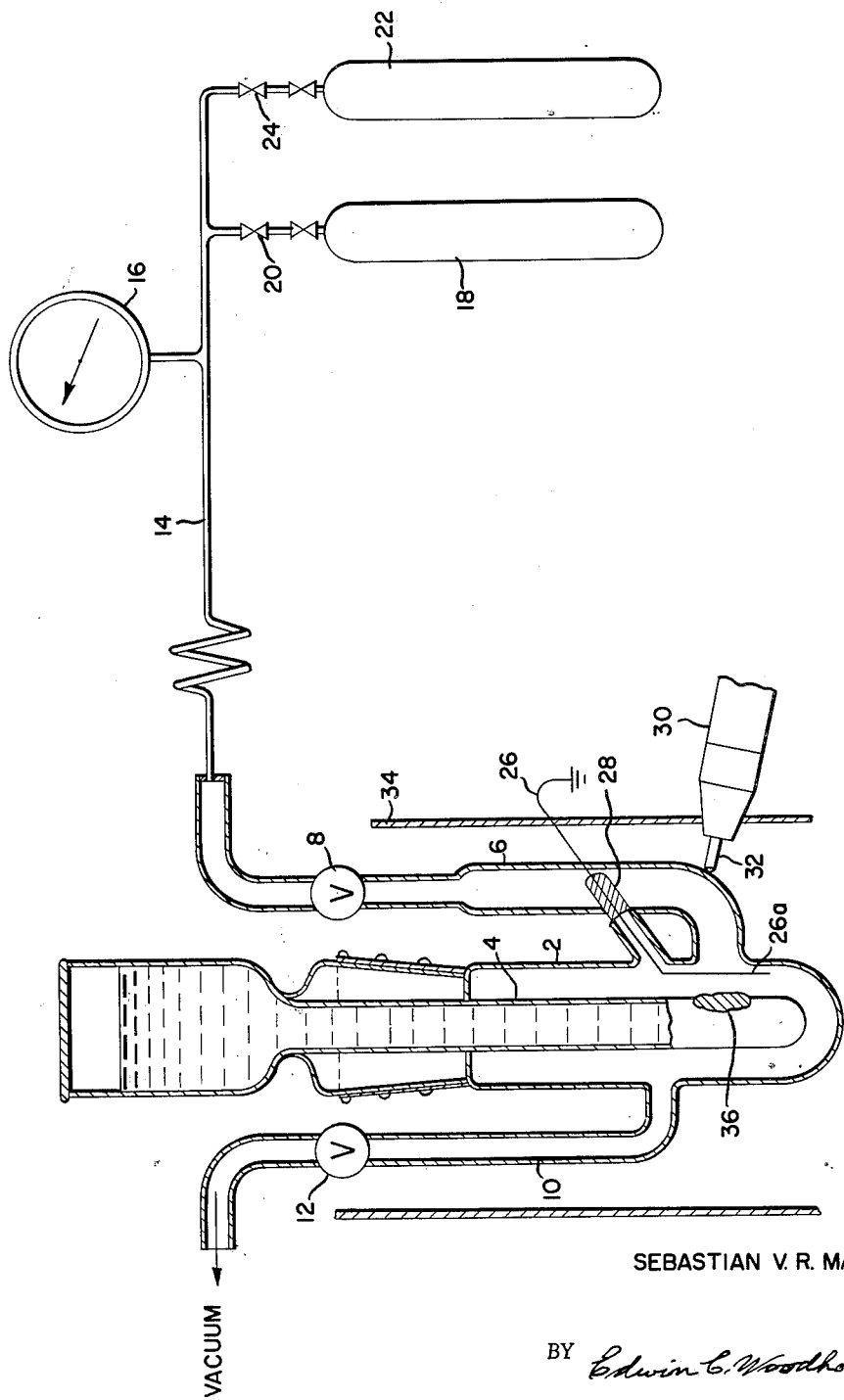

3,196,115
TRIFLUOROMETHYL RADICALS TRAPPED IN A MATRIX OF SOLIDIFIED GAS
Sebastian V. R. Mastrangelo, Wilmington, Del., assignor to E. I. du Pont de Nemours and Company, Wilmington, Del., a corporation of Delaware
Filed Feb. 9, 1961, Ser. No. 88,057
2 Claims. (Cl. 252—182)

This invention relates to a process for preparing trifluoromethyl radicals trapped in a matrix of a solidified gas, to the products of such process, and to a process for reacting the trapped trifluoromethyl radicals with desired reactant materials.

It is well known that free radicals of any sort are highly reactive and highly unstable entities. Considerable attention has been devoted of late to the problem of isolating free radicals under such conditions that their physical and chemical properties can be studied and their reactions controlled. The most serious difficulty to the solution of such problem has been the isolation of the free radicals in sufficient quantity to be useful in preparative chemical reactions and syntheses. The existence of the trifluoromethyl free radical ($CF_3$) has been postulated as a reaction intermediate in several reactions. However, the isolation of the free radical has not been accomplished prior to this invention, and the adsorption spectra thereof have not been reported heretofore. Also, although it is well known that radio frequency electric discharges will form free radicals in many cases, such discharges have not been applied heretofore to fluorocarbons. Since isolated trifluoromethyl radicals would be useful intermediates for the preparation of a wide variety of useful chemical compounds, it is desirable to provide a process for preparing and isolating them in a stable and useful form.

It is an object of this invention to provide trifluoromethyl radicals trapped in a solid matrix in a stable and useful form. Another object is to provide a process for preparing and isolating trifluoromethyl radicals in a stable and useful form. A particular object is to provide a process for preparing and isolating trifluoromethyl radicals trapped in a solidified gas under such conditions that their physical and chemical properties can be studied and their reactions controlled. A further object is to provide a process for the controlled reaction of trapped trifluoromethyl radicals to provide a variety of useful products. Other objects are to provide new compositions of matter and to advance the art. Still other objects will appear hereinafter.

The above and other objects of this invention may be accomplished by subjecting hexafluoroethane (perfluoroethane) or mixtures thereof with other inert gases which have melting points above 107° K. to a concentrated radio frequency electric discharge and then condensing the reaction mixture on a condensing surface which is maintained at a temperature below 107° K. (−166° C.). The radio frequency electric discharge converts some of the hexafluoroethane to free trifluoromethyl radicals, and the undecomposed hexafluoroethane and the other gases condense on the condensing surface as a solid matrix containing trapped trifluoromethyl radicals. The resulting composition, consisting essentially of the trifluoromethyl radicals trapped in the solid matrix at a temperature below 107° K., is a novel and useful composition and forms a part of this invention. A further feature of this invention comprises the process of reacting the trapped trifluoromethyl radicals by treating the deposit (of solid matrix and trapped trifluoromethyl radicals) with an excess of a reactant material which has a boiling point below 21° C. at 10 mm. of mercury, and then causing the temperature of the condensing surface and of the materials condensed thereon to rise to a temperature of at least 107° K., whereby the trifluoromethyl radicals react with such reactant material to provide the desired reaction products.

It could not be predicted that trifluoromethyl radicals would be formed from hexafluoroethane under the influence of radio frequency electric discharges, and that such radicals could be isolated in a stable and useful form. A trifluoromethyl radical in the gas phase, resulting from a pyrolytic or other type reaction, is both highly reactive, generally reacting with any species present, and unstable, tending to decompose to difluoromethylene radicals, carbon, etc. However, by proceeding in accord with the process of this invention, that is, by subjecting gaseous hexafluoroethane to a radio frequency electric discharge concentrated near a condensing surface maintained below 107° K., a substantial portion of the hexafluoroethane is efficiently converted to trifluoromethyl radicals which are effectively trapped in the solidified matrix that is condensed on the condensing surface. The deposit, of trapped trifluoromethyl radicals in the solid matrix, has a red color and is stable so long as it is maintained at a temperature below 107° K. The isolated trapped trifluoromethyl radical has the advantage that other subsequent reactions can be readily controlled.

The trifluoromethyl radicals must be trapped in a solid inert matrix, that is, a material which has a melting point above 107° K. and which will not react with the trifluoromethyl radicals and will not form other free radicals when subjected to a radio frequency electric discharge. The most convenient matrix is hexafluoroethane (M.P. 172.5° K.), since this material is the preferred source of the trifluoromethyl radicals. The hexafluoroethane may be diluted or mixed, if desired, with one or more other inert matrix forming materials, i.e. inert materials having melting points above 107° K. and boiling points below 21° C. at 10 mm. of mercury. Representative of such other matrix forming materials are xenon (M.P. 161° K.), krypton (M.P. 116° K.), sulfur hexafluoride (M.P. <222° K.), and selenium hexafluoride (M.P. 234° K.). The proportion of such other inert matrix forming materials, which may be used in admixture with the hexafluoroethane, is limited solely by economic considerations, as major proportions thereof will tend to decrease the concentration of the trapped trifluoromethyl radicals in the deposits.

The trapped trifluoromethyl radical in the solid matrix may be readily reacted with other desired reactant material which has a boiling point below 21° C. at 10 mm. of mercury, by merely admitting an excess of such other reactant to the reaction system and then allowing the system to warm up to at least 107° K. The reaction takes place rapidly at 107° K. Preferably, the reactant material will be one which has a melting point above 107° K., and hence will condense as a solid over the radical-containing deposit. A "reactant material" will be understood to mean any element or compound which normally reacts with free organic radicals under normal reaction conditions. Representative reactant materials, subject to the boiling point limitation, include hydrogen; the halogens such as chlorine, bromine, and fluorine; the hydrogen halides such as hydrogen fluoride, hydrogen chloride, hydrogen bromide, and hydrogen iodide; and unsaturated compounds such as the olefins and the acetylenic compounds which may contain halogen atoms, e.g. ethylene, propylene, the butenes, the butadienes, tetrafluoroethylene, vinyl fluoride, vinyl bromide, vinyl chloride, vinyl iodide, difluoroethylene, trifluoroethylene, 1-butyne, and the like. Representative reactions, which have been carried out in this manner, are shown by the following equations:

$2CF_3\cdot + Cl_2 \rightarrow 2CF_3Cl$
$2CF_3 + Br_2 \rightarrow 2CF_3Br$
$2CF_3\cdot + H_2 \rightarrow 2CF_3H$
$CF_3\cdot + nCF_2=CF_2 \rightarrow CF_3CF=CF_2 + CF_3CF_2CF_3 +$ polymer The above described products are well known useful species. The first three products are well known commercial compounds used as refrigerants, fire extinguishing agents, propellants and the like. Polymers of tetrafluoroethylene are well known. Hexafluoropropylene and octafluoropropane are also valuable products, the former as an intermediate for valuable polymers.

A form of apparatus, suitable for use in the practice of this invention, is shown diagrammatically in the accompanying drawing. The apparatus comprises a tubular jacket or envelope 2 surrounding a tubular cold-finger 4 containing a liquid refrigerant such as liquid nitrogen. The jacket 2 is provided, near the lower end of the cold-finger, with an inlet side arm 6 equipped with a valve 8. The jacket 2 is also provided with an outlet side arm 10, positioned on the opposite side of the jacket from the inlet side arm 6 and higher on the jacket, equipped with a valve 12 and connected to a conventional source of high vacuum (not shown). The side arm 6 is connected, by line 14, to a vacuum gauge 16, and to a container 18 for starting materials through valves 20, and to a container 22 for reactants through valves 24. The reactor, comprising the jacket 2, cold-finger 4 and side arms 6 and 10, is gas tight to exclude air and other undesired or contaminating substances. A wire 26, which is a conductor of electricity, passes through a seal 28 in the jacket 2 and has its inner end portion 26a positioned near the wall of the cold-finger and between the cold-finger and the end of the side arm 6. The wire 26 will be grounded at its outer end to any convenient earth ground. A source 30 of radio frequency electric power, such as an air-core Tesla coil, is coupled to a means 32 for applying a radio frequency electric discharge to a lower portion of the outer surface of the reactor near the portion 26a of the wire 26.

The reactor assembly, including the jacket 2 and the arms 6 and 10, may be surrounded by an open-ended cylinder 34 of polyethylene or the like through which warm air may be passed, particularly when the atmosphere is humid, to prevent condensation of water on the outer surface of the reactor. Such water condensation tends to markedly lower the efficiency of the apparatus. Alternatively, the reactor assembly may be enclosed in a sealed container to prevent contact of the atmosphere therewith.

The cold-finger 4, the jacket 2, and the arms 6 and 10 are constructed of materials which are non-conductors of electricity and which are transparent to radio frequency electric discharges. They may be made of glass, quartz, glazed porcelain, glazed alumina, and the like. Preferably, they are made of glass and particularly of glass which will withstand large temperature variations, such as Pyrex glass. As shown and as used in the examples given hereinafter, the cold-finger 4 conveniently had an outside diameter of 2.5 cm. and the jacket 2 had a length of 16 cm. and an inside diameter of 5.5 cm., whereby the inner surface of the jacket was spaced 1.5 cm. from the surface of the cold-finger. With a cold-finger of the size shown, the inside diameter of the jacket 2 can be considerably larger, but should not be materially smaller as the higher surface to volume ratio resulting from closer spacing of the opposing surfaces tends to cause recombination of the radicals before they can be trapped.

The cold-finger or condensing surface must be maintained at a temperature below 107° K., and this may be accomplished by any means known to the art. Most conveniently such temperature is obtained by maintaining in the cold-finger a suitable liquefied gas refrigerant. Representative liquefied gas refrigerants and their boiling points are liquid nitrogen, 77° K. (−195.8° C.); liquid hydrogen, 14° K. (−259° C.); liquid helium, 4.3° K. (−269° C.); liquid fluorine, 85° K. (−188° C.); liquid oxygen, 90° K. (−183° C.); liquid argon, 84° K. (−189.2° C.); liquid neon, 24.5° K. (−248.7° C.); and liquid air which gives a temperature between 77° K. and 90° K., but does not remain constant. Liquid nitrogen is much preferred because the others have one or more disadvantages of being difficult to obtain, being very expensive, or presenting very serious fire, corrosion, or toxic hazards.

The ground wire 26 preferably is made of tungsten, copper, or platinum, each of which has been used successfully, and may be made of silver, steel, or aluminum if desired. Gold wire is not suitable. The portion 26a of the ground wire should be positioned near the condensing surface of the cold-finger, i.e. near where the trapped radicals are to be deposited, so as to cause the electric discharge to be concentrated in a zone at or near the condensing surface. In the absence of the ground wire, the radio frequency electric discharge spreads throughout the reactor, resulting in poor efficiency of operation. Ordinarily, the ground wire is spaced about 0.5 to about 1 cm. from the condensing surface. Two or more of such ground wires may be used to increase the concentration of the radio frequency discharge or to increase the number or size of the deposits.

The radio frequency electric discharge is passed through the reactor near the condensing surface and near the portion 26a of the ground wire 26. The position of the radio frequency electric discharge source 32 shown in the drawing is a preferred approximate position and not a fixed point and such position may be varied to some extent at will. Any convenient source of radio frequency electric power may be used. A very convenient source is an air-core Tesla coil. Other suitable sources are diathermy units and the like. The methods of coupling the radio frequency power source and applying the electric discharge therefrom to the reactor well known; several recently used methods being described in the book on "Formation and Trapping of Free Radicals," by A. M. Bass and H. P. Broida, Academic Press, N.Y., 1960, see particularly pages 53 and 54.

In operation, the reactor is evacuated with a mercury diffusion pump to from about $10^{-5}$ to about $10^{-6}$ mm. Hg to remove adsorbed moisture. The wire 26 is grounded. A radio frequency electric discharge is applied to the outer surface of the jacket 2 in the approximate position shown on the drawing, and passes through the reactor, being concentrated near the surface of the cold-finger in the vicinity of the portion 26a of the ground wire 26. Then hexafluoroethane (or a mixture thereof with other matrix forming gases) is fed from tank 18 at a moderate rate into the reactor, and passes through the zone of concentrated radio frequency electric discharge and then into contact with the condensing surface of the cold-finger. Some of the hexafluoroethane is decomposed by the radio frequency electric discharge to form trifluoromethyl radicals. Unreacted hexafluoroethane (and any other matrix forming gas) freezes out on the cold-finger and, simultaneously therewith, the trifluoromethyl radicals collect in the frozen hexafluoroethane, forming a red deposit 36.

When the desired amount of deposit has been collected, the feed of hexafluoroethane is stopped and the radio frequency electric discharge is discontinued.

When it is desired to react the free trifluoromethyl radical with other reactant materials, the red deposit 36 will be maintained at below 107° K. and an excess of the other reactant material will be introduced from tank 22. The refrigerant is removed from the cold-finger and the temperature allowed to rise. When the temperature reaches 107° K., the color of the deposit rapidly fades and the reaction between the free radical and the other reactant takes place.

The resulting reaction products may be recovered in any conventional manner. The temperature in the reactor or of the cold-finger may be raised to melt the products, whereby they can be poured from the reactor, or to distill off the reaction products. They may also be removed by washing with a suitable solvent. If any of the products cannot be readily recovered by such means, they can be scraped off of the cold-finger.

The reactor may be operated at any pressure up to about 1 atmosphere, but it is preferred to employ pressures in the range of from about 0.1 to about 10 mm. of mercury. The hexafluoroethane, the mixtures thereof with other matrix forming materials, and the reactant materials for reaction with the trifluoromethyl radicals ordinarily will be fed to the reactor at about atmospheric pressure, the lower pressures in the reactor being obtained and maintained by control of the rate of feed of such gaseous materials and the application of a vaccum to the outlet side arm 10 of the reactor.

The gaseous materials ordinarily will be fed to the reactor at the ambient temperature, i.e. at about room temperature. They may be fed at higher or lower temperatures, if desired, but must be fed at temperatures above their boiling points at the pressure employed. For example, bromine would have to be heated to above its boiling point, about 59° C., if the system pressure is near atmospheric pressure. However, under the preferred pressure of 10 mm. of mercury or less, bromine is gaseous at normal room temperatures and heating thereof is not then required. Under the preferred conditions employing the feed gases at about room temperatures, the temperatures at all points throughout the reactor, except the cold-finger or the condensing surface, will be at about room temperature and hence above the boiling points of the feed gases, so that such gases will not condense in the reactor other than on the cold-finger or condensing surface.

In order to more clearly illustrate this invention, preferred modes of carrying it into effect, and the advantageous results to be obtained thereby the following examples are given in which the parts and proportions are by weight except where specifically indicated otherwise.

*Example 1*

The apparatus employed was that shown in the drawings and more particularly described hereinbefore. Liquid nitrogen was used as the refrigerant in the cold-finger. The reactor was evacuated with a mercury diffusion pump to a pressure of from $10^{-5}$ to $10^{-6}$ mm. of mercury to remove the adsorbed moisture. Wire 26 was grounded and the radio frequency electric discharge from an aircore Tesla coil was applied to the outer surface of the outer jacket 2. Then hexafluoroethane was fed to the reactor at room temperature and at a rate of from about 4 to about 14 volumes per reactor volume per hour, resulting in a red deposit 36 consisting essentially of trifluoromethyl radicals trapped in solidified hexafluoroethane. The visible adsorption spectrum of the deposit was determined and found to contain adsorption peaks at 3975 A., 4450 A. (minor), 4680 A., 4830 A., 4895 A., 4940 A., 5400 A., 5260 A., 5360 A., 5460 A., 5550 A., 5600 A., 5660 A., 5720 A., and 5900 A. (minor). These adsorptions account for the red color. Hexafluoroethane is essentially transparent to light in this region. When the deposit was allowed to warm up, the red color faded rapidly when the temperature reached 107° K. Analysis of the resulting product showed it to consist entirely of hexafluoroethane.

*Example 2*

The apparatus and process of Example 1 was repeated to the formation of the red deposit. Then an excess of chlorine was admitted to the reaction system and condensed over the red deposit. The liquid nitrogen was then removed from the cold-finger. When the temperature reached 107° K., the red color in the deposit rapidly faded. Analysis of the resulting gaseous mixture, after removing excess chlorine, discloses the presence of chlorotrifluoromethane and hexafluoroethane only. Thus the yield of chlorotrifluoromethane was 100% based on hexafluoroethane converted to free radicals. The radical concentration varied from 0.3 to 0.7 mole percent based on total chlorinated product but this could have been much higher since recombination of $CF_3$ radicals gives the parent compound $C_2F_6$.

When chlorine, in the above experiment, was replaced by bromine or hydrogen, bromotrifluoromethane or trifluoromethane were obtained in essentially the same yield.

*Example 3*

The procedure of Example 2 was repeated, substituting tetrafluoroethylene for the chlorine. The product of the reaction was a mixture of valuable materials comprising about 25% of hexafluoropropylene, about 25% of octafluoropropane, about 50% of polytetrafluoroethylene, and trace amounts of perfluorobutenes, perfluorobutanes and perfluorohexanes, all based on the amount of hexafluoroethane consumed.

The red colored deposit was identified as trapped or "captive" trifluoromethyl radicals in a solid hexafluoroethane matrix by its reaction products in Examples 2 and 3, and by its adsorption spectrum. The existence of a free radical was also indicated by paramagnetic resonance studies.

It will be understood that the preceding examples have been given for illustrative purposes solely and that this invention is not restricted to the specific embodiments described therein. On the other hand, it will be apparent to those skilled in the art that, subject to the limitations set forth in the general description, many variations can be made in the materials, conditions and techniques employed without departing from the spirit or scope of this invention.

From the preceding description and examples, it will be apparent that this invention provides a novel process for preparing trapped trifluoromethyl radicals in a stable and useful form. The compositions, of the trifluoromethyl radicals trapped in the solid matrix, are novel and useful compositions which are valuable for making a variety of useful products. Also, this invention provides a novel process for isolating trifluoromethyl radicals and reacting them with desired reactant materials to produce a wide variety of valuable and useful fluorine-containing compounds, i.e., this invention provides a novel process for making such fluorine-containing compounds from hexafluoroethane. Therefore, it will be apparent that this invention constitutes a valuable advance in and contribution to the art.

The embodiments of the invention in which an exclusive property or privilege is claimed are defined as follows:

1. A composition consisting essentially of trifluoromethyl radicals trapped at a temperature below 107° K. in a solid matrix of the group consisting of hexafluoroethane and mixtures of hexafluoroethane and an inert material having a melting point above 107° K. and a boiling point below 21° C. at 10 mm. Hg.

2. A compoistion consisting essentially of trifluoromethyl radicals trapped at a temperature below 107° K. in a solid matrix of hexafluoroethane.

References Cited by the Examiner

UNITED STATES PATENTS

| | | | |
|---|---|---|---|
| 2,575,807 | 11/51 | Griesinger | 252—182 |
| 2,672,438 | 3/54 | Hertog et al. | 204—169 |
| 2,676,145 | 4/54 | Weisz et al. | 204—169 |
| 2,892,766 | 6/59 | Broida et al. | 204—164 |
| 2,924,562 | 2/60 | Golden | 204—164 |
| 2,988,513 | 6/61 | Brown | 252—182 |
| 3,062,730 | 11/62 | Ruehrwein | 204—176 |
| 3,081,245 | 3/63 | Farlow | 204—169 |

OTHER REFERENCES

Page 20, October 1953, Nucleonics, vol. 11, No. 10.

Pages 9–11 (1956), Fluorocarbon Derivatives, Haszeldine, No. 1.

ALBERT T. MEYERS, *Primary Examiner*.

JOHN R. SPECK, *Examiner*.